Patented Nov. 9, 1926.

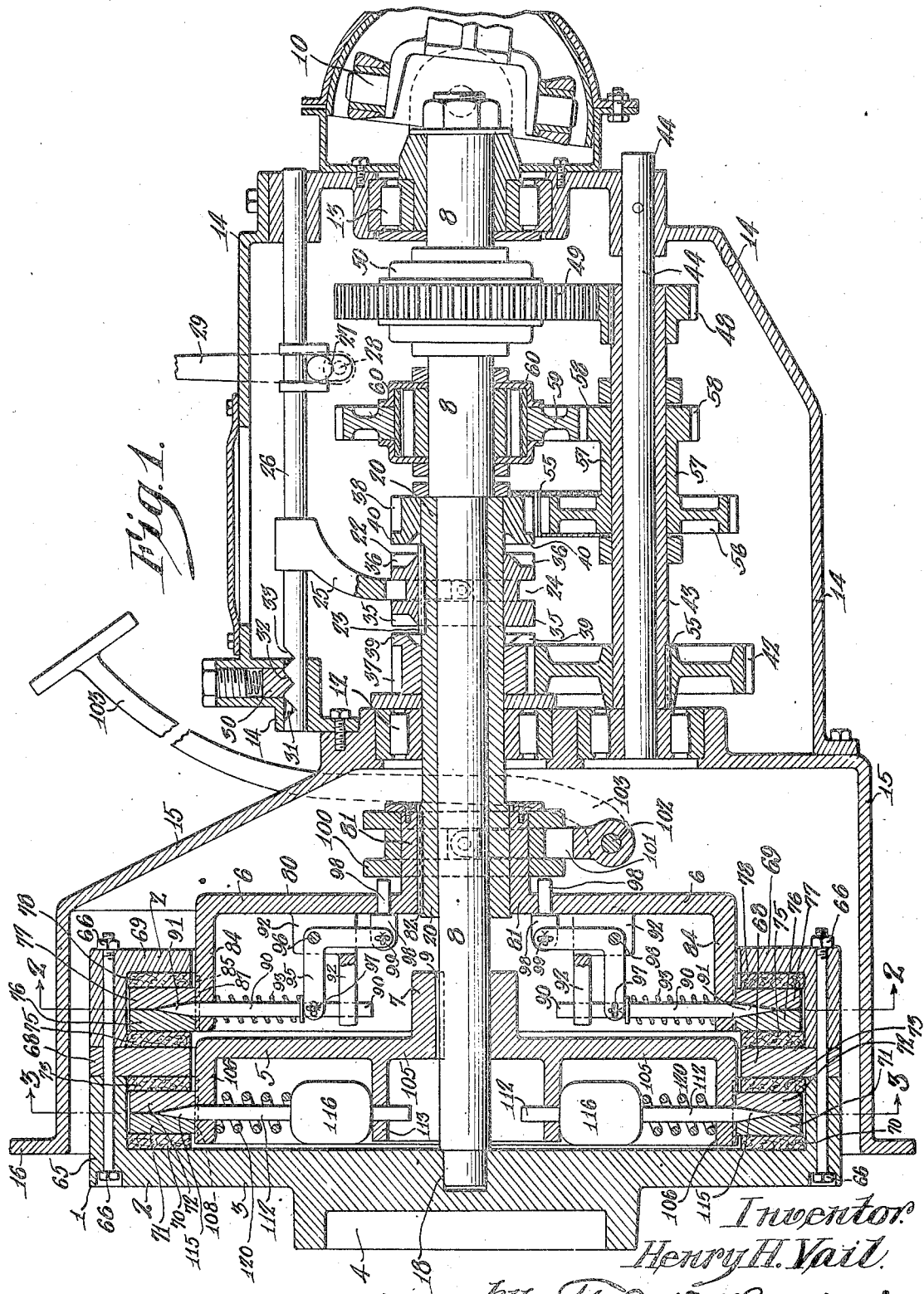

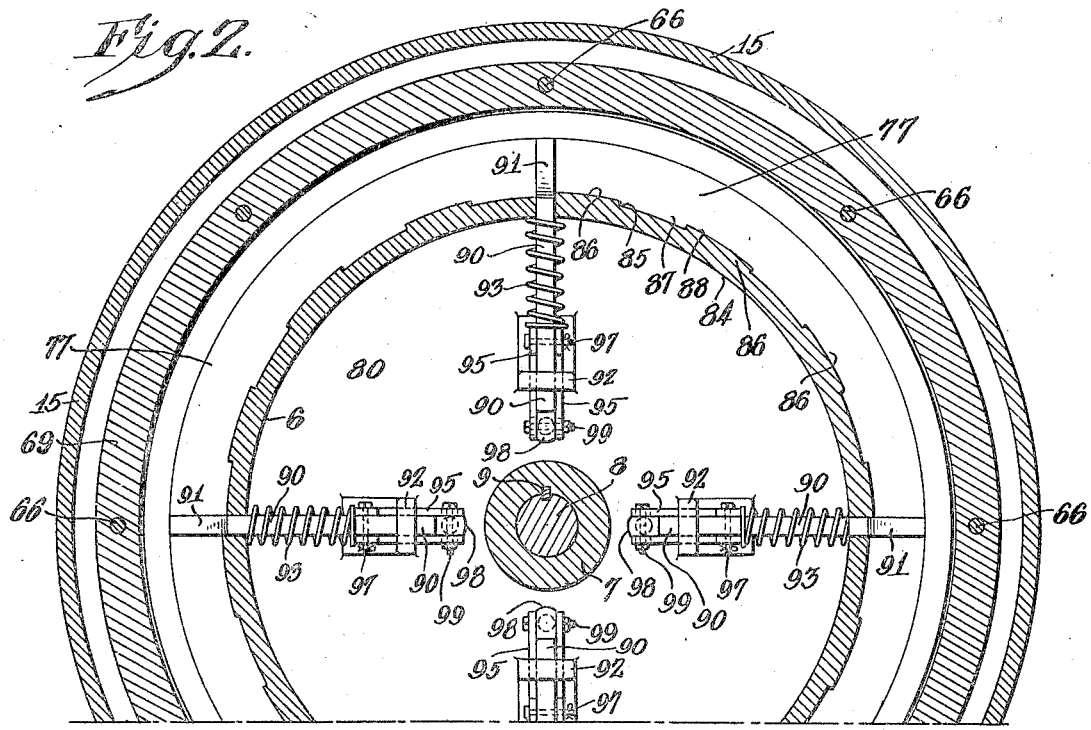
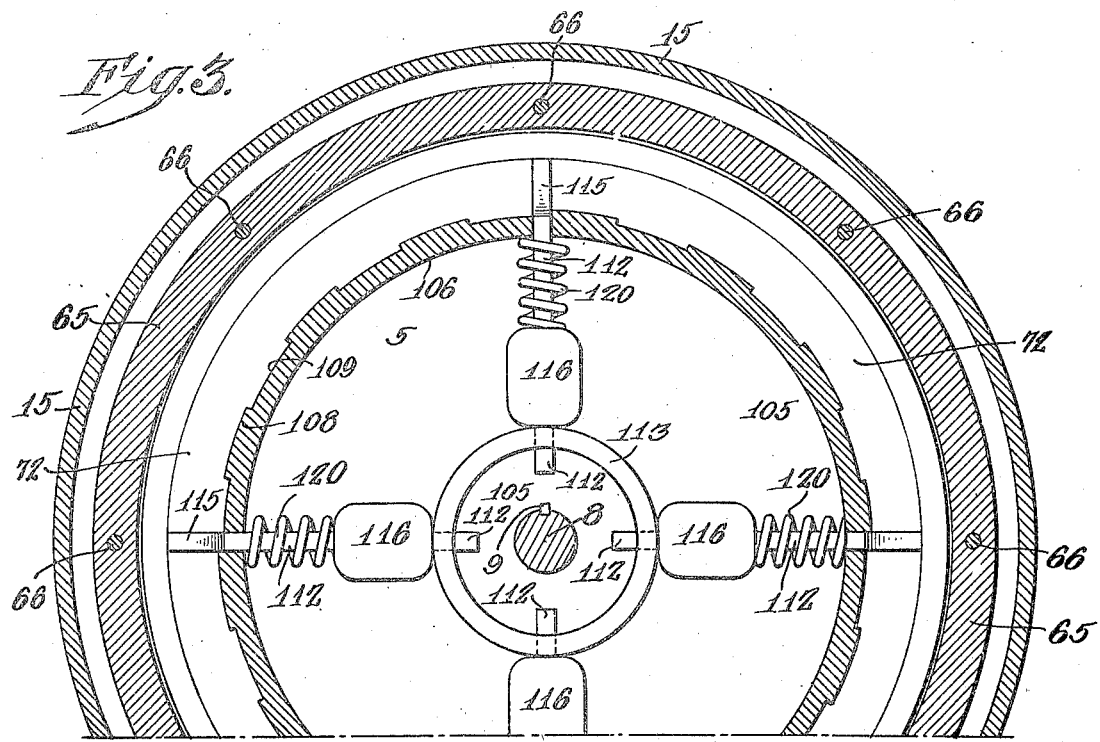

1,606,544

UNITED STATES PATENT OFFICE.

HENRY H. VAIL, OF CAMDEN, NEW JERSEY.

TRANSMISSION MECHANISM.

Application filed July 16, 1925. Serial No. 43,982.

My invention relates to improvements in transmission mechanism for vehicles using internal combustion engines which require a change of the gear ratio between the engine and driving wheels of the vehicle and which also require means for disconnecting the engine from the load in starting the engine.

The object of my invention is to provide a transmission mechanism for vehicles in which the manual operation, or control of the vehicle is simplified; a further object of my invention is to provide a transmission mechanism comprising a clutch having two driven members, one of which is automatically engaged and disengaged by centrifugal force, controlled by the speed of vehicle, and adapted for driving the vehicle at high speed; a further object is to provide reducing gears, of the sliding gear type, adapted to be driven by the other one of said clutch driven members, for driving the vehicle at a slow speed; a further object of my invention is to provide an automatic gripping device for communicating power from said slow speed clutch driven member to the vehicle when starting and when moving at slow speed; a still further object of my invention is to so arrange said automatic gripping device that it will automatically release and permit the vehicle to be driven at a higher speed by the high speed clutch driven member than it would otherwise be driven by the slow speed gearing; a still further object of my invention is to provide means for manually engaging the slow speed clutch driven member when it is desired to start the vehicle in motion; a still further object is to provide manually operated gear shifting means by which the gearing may be disengaged or put into the neutral position when the vehicle is to remain at rest; a still further object is to provide a reverse gear adapted to be manually controlled for reversing the movement of the vehicle, and a still further object is to provide various novel forms and arrangements of the parts of the transmission mechanism, which will be more fully hereinafter described and claimed.

Referring to the accompanying drawings, Fig. 1, is a central vertical sectional view of my novel form of transmission mechanism; Fig. 2 is a partial transverse sectional view on line 2—2, Fig. 1; and Fig. 3 is a partial transverse sectional view on line 3—3, Fig. 1.

Referring to the accompanying drawings in which like reference characters refer to like parts, 1 represents a clutch consisting of a driving member 2, in the form of a disk 3, having a central portion, or hub, 4, adapted to be secured to an engine, not shown in the drawing, in a manner well known in the art. Said clutch further consists of two driven members 5 and 6 adapted for communicating power to the wheels of the vehicle, not shown in the drawings, through a shaft 8, operatively connected at one end thereof to a universal joint 10, in the usual manner.

The shaft 8 is rotatably mounted in bearings 12 and 13 secured in a housing 14, encasing the transmission gearing. Said housing 14 is secured in any suitable manner to the clutch casing 15, having flanges 16 adapted to be secured to the rear housing of an engine. The shaft 8 at its forward end is loosely mounted in a recess 18 formed in the center of the disk 3 of the driving member 2 of the clutch. The forward portion of said shaft 8 is reduced in diameter and has a sleeve 20, loosely mounted on said reduced portion. Said driven clutch member 6 is rigidly secured to said sleeve 20 and is adapted for communicating power from the driving member 2 of the clutch, through said sleeve 20, to the low gear and reversing mechanism of the transmission gearing. The driven member 5 of the clutch is provided with a hub 7, rigidly secured by a key 9 to the forward end of the shaft 8 and communicates power direct through said shaft 8 and the universal joint 10, to the wheels of the vehicle.

Upon said sleeve 20 is mounted a sliding member 22, which is secured upon the sleeve 20 by a key 23, which causes the sliding member 22 to rotate with the sleeve and permits said member to slide longitudinally upon the sleeve. Said sliding member 22 is provided with an annular recess 24 adapted to receive the shifting arm 25, carried by a shift bar 26, slidably mounted in the housing 14. Said bar 26 is adapted to be moved by a cam 27 secured upon a transverse shaft 28, having operatively associated therewith a lever 29, adapted to be manually operated for shifting the bar 26 into the neutral position shown in Fig. 1. Said shift bar 26 may be shifted into different positions, in which said spring catch 30 will enter the V-shaped retaining notches 31, 32, or 33, formed in the sliding bar 26 and hold the latter against accidental movement.

The sliding member 22 is provided with clutch teeth 35 and 36 formed upon opposite end faces thereof, which teeth are adapted to interlock with the low gear wheel 37, or with the reversing gear wheel 38, having similar clutch teeth 39, and 40, respectively upon their end faces.

The gear wheels 37 and 38 are loosely mounted upon the sleeve 20. The low gear wheel 37 is always in mesh with a gear wheel 42 secured upon a counter-sleeve 43, loosely mounted upon a side shaft 44, secured in the housing 14. Said counter sleeve 43 has secured thereon, a gear wheel 48 which is always in mesh with a gear wheel 49, secured to the outer member of an automatic gripping device 50. Said gripping device 50 is mounted upon the shaft 8 and adapted for gripping and driving said shaft 8 when power is applied to said device 50, through the counter-sleeve 43. Said gripping device 50 is of any well-known standard construction adapted for automatically engaging the center shaft and rotating the same and also adapted for automatically releasing the shaft 8 when the latter is driven at a higher speed of rotation than the outer member of said device 50, thus it will be seen that the shaft 8 may be driven by another source of power at a higher speed than the speed of rotation of said device 50.

The reverse gear wheel 38 is loosely mounted upon the sleeve 20 and is adapted to be driven by the sliding member 22, when the latter is shifted into engagement with the gear 38 by means of the manually operated lever 29. Said gear 38 is always in mesh with an idler gear 55, which in turn is always in mesh with a gear 56 formed upon a sleeve or hub 57, which latter is loosely mounted upon said counter-sleeve 43. Upon the hub 57 carrying the gear 56 is a second gear 58 which is always in mesh with a gear 59 formed upon the outer member of an automatic gripping device 60 mounted upon the shaft 8. The automatic gripping device 60 is similar in construction to the above described gripping device 50, but said device 60 is so positioned upon said shaft 8 that it will automatically engage and rotate the shaft in the opposite direction from the gripping device 50. Thus it will be seen that the shaft 8 may be driven in either direction by power applied to the sleeve 20, according to the position in which the sliding member 22, is placed in relation to the low gear 37 or the reverse gear 38. When the sliding member 22, is in the position shown in Fig. 1, the gears 37 and 38 are disengaged and the vehicle will not be driven through either of said gears 37 and 38.

The clutch 1, comprising a driving member 2, and the two driven members 5 and 6, consists of the disk 3 on which is mounted a cylindrical flange 65, to which is secured by bolts 66, a spacing flange 68 and a face flange 69. Between the disk 3 and the spacing flange 68 are loosely mounted collars 70, 71, 72 and 73. The collars 71 and 72 form part of the high speed clutch member 5 and rotate with the same. Between the spacing flange 68 and the face flange are collars 75, 76, 77 and 78. Said collars 76 and 77 form part of the slow speed clutch member 6 and rotate with the latter.

The slow speed driven clutch member 6 consists of a disk 80 having a hub 81, which is secured by a key 82 to the sleeve 20. Upon the periphery of the disk 80 is a cylindrical flange 84 having longitudinal grooves 85 and ribs 86 which are engaged by corresponding ribs 87 and grooves 88 formed upon the inner periphery of the collars 76 and 77. The adjacent faces of said collars 76 and 77 are bevelled and are adapted to be moved longitudinally by a wedged shaped bar 90 upon said cylindrical flange 84, into frictional engagement with the collars 75 and 78 which in turn are moved into frictional engagement with the spacing flange 68 and face flange 69, whereby all of said collars will be rotated by the driving member 2 of the clutch and thus rotate the slow speed clutch member 6.

Upon the flange 84 of the slow speed driven member 6 are slidably mounted bars 90 having wedge shaped outer ends 91 adapted to be moved radially between the bevelled surfaces of the collars 76 and 77 and force said collars into gripping engagement with the driving member 2 of the clutch and thus rotating the driven member 6. Said bars 90 are slidably mounted at their inner ends in bearings 92 formed upon the disk 80 and the opposite end of each bar 90 is loosely mounted in an aperture formed through the flange 84. A spring 93 upon the bar 90 tends to slide the bar inwardly towards the central shaft 8 and normally holds the bar out of engagement with the collars 76 and 77, thus permitting the collars to remain idle when the driving member 2 of the clutch is rotating. The bar 90 is adapted to be moved outwardly by a bell-crank-lever 95, pivoted upon a shaft 96, in said bearing 92, on the disk 80. One arm of the bell-crank-lever 95 is secured by a pin 97 to the bar 90 and the opposite arm is pivotally secured to a push bar 98 by a pin 99. Said push bar 98 is slidably mounted in the disk 80 and is adapted to be moved inwardly by a collar 100 which is slidably mounted upon the hub 81 by an arm 101 secured upon a shaft 102, mounted in suitable bearings in the casing 15. Said shaft 102 having secured thereon a foot lever 103 adapted for operating the collar 100. A forward movement of the foot lever 103 will move the collar 100 into engagement with the push bar 98 and operate the bell-crank-levers 95 so as to force the wedge shaped bars 90 outwardly and into engagement with the collars 76 and 77, causing said collars to engage with and be rotated by the driving member 2 of the clutch. Said collars in turn will rotate the slow speed driven member 6, which is secured to the sleeve 20 and said sleeve 20 will rotate the sliding member 22 thereon, and the latter may be shifted into engagement with the low gear 37 or with the reverse gear 38.

The high speed driven clutch member 5, comprises a disk 105 formed on the hub 7, which latter is secured to the shaft 8, as above described. The disk 105 is provided upon its periphery with a cylindrical flange 106 around which are positioned the collars 71 and 72, which are slidable longitudinally upon the flange 106. Said flange 106 and the collars 71 and 72 are provided with interlocked ribs 108 and 109 respectively, adapted for rotating the driven member 5 with the collars 71 and 72. Radial bars 112 are slidably mounted upon a bearing 113 formed upon the disk 105. The outer ends of the bars 112 are slidably mounted in apertures formed in the cylindrical flange 106. The bars 112 are provided with wedge shaped outer ends 115 and upon said bars 112 are secured weights 116 adapted for sliding the bars 112 outwardly by the action of centrifugal force, when the driven member 5 is rotated at a given speed. A calibrated spring 120 is mounted upon the bar 112 and interposed between the weight 116 and the cylindrical flange 106. Said spring is adapted to resist the movement of the weight 116 and the bar 112 until the speed of the vehicle and the driven member 5 has reached a predetermined speed, at which time the spring 120 will yield and allow the wedge shaped end 115 of the bar 112 to move outwardly separating the collars 71 and 72, thus forcing said collars into frictional engagement with the collars 70 and 73, which in turn are forced into frictional engagement with the disk 3 and the spacing flange 68 of the driving clutch member 2, thus it will be seen that the driving clutch member 2 will rotate the disk 105 of the driven high speed clutch member 5 and rotate the shaft 8 at the same speed that the driving clutch member 2 is rotated.

The above described gripping members 50 and 60 are so arranged that they will automatically release the shaft 8 and allow the shaft 8 to revolve at a higher speed than the rotation of said gripping members 50 and 60. By this arrangement the foot lever 103 may be manually held in a position to engage the pin 90 with the collars 76 and 77 of the driving clutch member until the speed of the vehicle is sufficient to automatically move the weights 116 and the bars 112 outwardly so that the latter will force the collars 71 and 72 into locking engagement with the driving member 2 of the clutch. In this instance power from the driving member 2 is applied simultaneously to both the high speed driven member 5 and the low speed driven member 6, but the gripping member 50 will automatically release the slow speed driven member 6 from the shaft 8, due to the increased speed of revolution of the shaft 8 in relation to the speed of revolution of the gripping member 50 and the slow speed driven member 6.

As shown in Figs. 2 and 3, the driven members 5 and 6 are provided with several engaging bars 90 and 112, and parts associated therewith, for insuring an even distribution of the strains through the different radial portions of said driven members 5 and 6. These parts being duplications of each other, the above description refers to the duplications of the parts.

I have shown two separate gripping devices 50 and 60 in this embodiment of my invention for rotating the shaft 8 at slow speed forward and slow speed reverse, however, one double acting automatic gripping device may be used to accomplish the same result without departing from my invention.

The operation of my invention is as follows: When the driving clutch member 2 is rotated by the engine, the vehicle may be started by operating the manually controlled lever 29 provided for shifting the sliding member 22 into engagement with the slow speed gear wheel 37 or with the reverse gear wheel 40. To drive the vehicle forward, the member 22 is thus moved into engagement with the gear 37 and it is allowed to remain in engagement with said gear 37 during the normal driving of the vehicle at either slow speed or high speed, thus it will be seen that the shifting of the sliding member 22 is only necessary for moving the parts into a neutral position or for shifting the parts into reverse gear. By moving the foot lever 103 forward, the radial bars 90 are moved outwardly, thus engaging the collars 76 and 77 with the driven clutch member 2, causing the slow speed driven member 6 to revolve with the driving clutch member 2. Power is thus applied from the driving clutch member 2, through the driven slow speed member 6, secured upon the sleeve 20, which latter imparts motion to the sliding member 22, which is interlocked with the gear 37. The gear 37 rotates the gear 42, the counter sleeve 43, the gear 48 and the gear 49 upon the automatic gripping device 50, which latter automatically grips the shaft 8 and rotates the same, thus moving the vehicle forward at slow speed. The foot lever 103 is held forward during the driving of the vehicle at slow speed. When the speed of the car has increased sufficiently so that the revolving high speed clutch member 5, which is secured to the shaft 8, will have sufficient speed of rotation to cause the weights 116 to move outwardly against the springs 112. The wedge shaped bars 112 will thus be forced into engagement with the collars 71 and 72 and lock said collars in frictional engagement with the driving clutch member 2, thus power will be imparted direct to the shaft 8, causing said shaft to rotate at a greater speed of rotation than the speed of rotation of the gripping device 50, which latter will cease driving the shaft 8, due to the fact that the shaft 8 is being rotated at a higher speed than the gripping device 50.

When it is desired to drive the vehicle rearwardly the manually controlled lever 29 is shifted to a position in which the sliding member 22 will engage the reverse gear wheel 40. The foot lever 103 is then pressed forward causing the bars 90 to move the collars 76 and 77 into driving engagement with the driving clutch member 2, thus causing the power to be applied through the driven slow speed member 6, the sleeve 20, sliding member 22, reverse gear 40, idler gear 55, gear 56, gear 58 and gear 59 secured upon the outer member of the gripping device 60 adapted for automatically engaging the shaft 8, when power is applied to said gripping device 60, thus rotating the shaft 8 in the direction to move the vehicle rearwardly. When the foot lever 103 is released the springs 93 will withdraw the radial bars 90 from engagement with the driving clutch member 2, and thus cut off the communication of power through the slow speed driven member 6, so that the sliding member 22 may be disengaged from the reverse gear 40.

When driving the vehicle at high speed and it is desired to stop, it is only necessary to slow down the speed of the engine so as to reduce the speed of the vehicle to a predetermined speed, at which reduced speed the springs 120 will automatically disengage the driven high speed clutch member 5 from the driving clutch member 2 and the vehicle may be brought to a stand still by applying brakes. It is not necessary to shift the lever 29 for disengaging the sliding member 22 from the gear wheel 37, as the slow speed driven clutch member 6 is normally disengaged from the driving clutch member 2 by the action of the springs 90, except when the foot lever 103 is held forward for driving the vehicle at slow speed forward or reverse.

I claim:

1. A vehicle transmission mechanism comprising, a source of power, a shaft operatively associated with the traction wheels of the vehicle, manually operated slow speed gearing associated with said source of power and with said shaft for rotating the latter at slow speed, a clutch driving member operated by said source of power, a clutch driven member concentrically mounted in relation to said clutch driving member, said clutch driven member mounted upon said shaft and normally disengaged from said clutch driving member, and clutch engaging means mounted upon the driven clutch member controlled by the speed of rotation of the clutch driven member adapted to directly engage said clutch members when the driven clutch member is rotating at a predetermined speed.

2. A vehicle transmission mechanism comprising, a driving clutch member having a cylindrical flange upon its periphery, an inwardly extending flange secured upon said cylindrical flange forming an annular chamber within said driving member, collars positioned within said chamber adapted to be moved axially into gripping engagement with the driving member, a shaft loosely mounted concentrically within said driving member, a driven high speed clutch member secured upon said shaft having a peripheral cylindrical flange positioned within said collars, a weighted member mounted upon and movable radially upon said driven member adapted to engage said collars at a predetermined speed of rotation of said driven member, and lock said driven member with said driving member, and means for rotating said shaft independently of said high speed driven member.

3. A vehicle transmission mechanism, comprising, a driving clutch member, collars mounted within said driving member, a shaft loosely mounted concentrically within said driving member, a driven high speed clutch member secured upon said shaft, said driven member positioned within said collars, bearings upon the driven clutch member, a bar mounted in said bearings and slidable radially upon said driven clutch member, a wedge shaped portion upon the outer end of said bar adapted to move said collars into locking engagement with the driving clutch member, a spring upon said driven clutch member tending to move said bar out of engagement with the collars, and means for rotating said shaft independently of said high speed driven clutch member.

4. A vehicle transmission mechanism comprising, a driving clutch member, a cylindrical flange on its periphery, a spacing flange upon said cylindrical flange, a face flange upon said spacing flange, collars positioned at either side of said spacing flange adapted to be moved axially into locking engagement with said flanges, a shaft loosely mounted concentrically with said driving clutch member, a driven high speed clutch member secured to said shaft, an annular peripheral flange upon said driven member positioned within said collars, a wedge shaped member mounted upon said driven member and movable radially through the flange of said driven member by the action of centrifugal force when the driven member is rotating at a predetermined speed, said wedge shaped member having a portion positioned between two of said collars adapted to force said collars into locking engagement with said flanges of the driving clutch member, a slow speed driven clutch member loosely mounted upon said shaft having a cylindrical flange upon its periphery positioned within the collars of the driving member adjacent to said face flange, a wedge shaped member mounted upon said driven slow speed clutch member adapted for forcing said last mentioned collars into locking engagement with said driving member, and manually operated means for moving said last mentioned wedge shaped member into and out of engagement with the driving member.

In testimony whereof I affix my signature.

HENRY H. VAIL.